United States Patent [19]
Leiber

[11] Patent Number: 4,657,314
[45] Date of Patent: Apr. 14, 1987

[54] APPARATUS AND METHOD OF CONTROLLING BRAKING OF AN AUTOMOTIVE VEHICLE, OPERATING IN A CURVED PATH

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 742,211

[22] Filed: Jun. 6, 1985

[30] Foreign Application Priority Data

Jun. 12, 1984 [DE] Fed. Rep. of Germany ....... 3421732

[51] Int. Cl.[4] .............................................. B60T 8/60
[52] U.S. Cl. ..................................... 303/100; 303/96; 303/111; 303/DIG. 4
[58] Field of Search ................. 303/100, 96, 110, 111, 303/DIG. 4, DIG. 3, 61, 106; 188/181 R, 181 A, 181 C

[56] References Cited

U.S. PATENT DOCUMENTS

| 3,637,264 | 1/1972 | Leiber et al. | 303/61 |
| 3,754,797 | 11/1971 | Rodi et al. | 303/96 |
| 3,791,702 | 2/1974 | Barckhardt et al. | 303/100 |
| 3,797,892 | 4/1972 | Leiber | 303/106 |
| 3,966,264 | 6/1976 | Mattori et al. | 303/100 |

FOREIGN PATENT DOCUMENTS

| 2259929 | 6/1974 | Fed. Rep. of Germany | 303/100 |
| 1383553 | 2/1975 | United Kingdom | 303/100 |
| 1490167 | 10/1977 | United Kingdom | 303/100 |

*Primary Examiner*—John W. Caldwell, Sr.
*Assistant Examiner*—Alvin Oberley
*Attorney, Agent, or Firm*—Frishauf, Holtz, Goodman & Woodward

[57] ABSTRACT

To maintain stability of operation of a vehicle entering a curve, for example with excessive speed upon entering the curve, and application of the vehicle brakes by the operator, the braking effort ($P_{HA}$) applied to the rear wheels or rear axle of the vehicle is controlled to be at a low and constant level, substantially below the braking effort ($P_{VL}$, $P_{VR}$) applied to the front wheels of the vehicle, and for a limited period of time (t), which may be a predetermined time duration, under control of a timing element (4), or which may depend on counted braking cycling events, of braking effort applied to the front wheels, for example under control of an anti-brake locking or blocking system (ABS). For example, a counter (8) may count two cycles of operation of the ABS and then release the low, constant braking effort phase applied to the rear wheels of the vehicle. Stability of operation of the vehicle, in the curve, is thus maintained.

14 Claims, 4 Drawing Figures

APPARATUS AND METHOD OF CONTROLLING BRAKING OF AN AUTOMOTIVE VEHICLE, OPERATING IN A CURVED PATH

The present invention relates to a method, and apparatus, to control vehicles operating in a curved path, and more particularly, when the vehicle is in a curve, to prevent operation of brakes in a manner which might cause loss of the control of the vehicle.

BACKGROUND

Maintenance of control of a vehicle operating in a curve, particularly at speeds close to the limit of adhesion of the vehicle to the road surface, places severe requirements on the suspension system of the vehicle, as well as on the brakes, and requires accurate matching of braking effort to tractive effort and the suspension system of the vehicle. It has been proposed to improve the matching of braking effort to operation of the vehicle by including elements in the braking system which reduce braking pressure, in dependence on actually existing braking pressure levels, or in dependence on deceleration and acceleration forces. For example, it has been proposed to reduce braking effort for example by reducing braking pressure in hydraulic brakes, by sensing longitudinal deceleration of the vehicle. It has also been proposed to reduce braking effort upon sensing transverse acceleration. Maintenance of stability of operation of the vehicle, particularly vehicles having an anti-lock braking system (ABS) therein, can be achieved by applying some braking effort, that is, partial braking, if at least one of the front wheels does not block, and the rear wheels are both prevented from blocking. Other operating characteristics, however, also may result in critical operation of the vehicle; slight braking, a typical reaction of a driver when the vehicle has to be steered in a curve and the speed is excessively high, may result in loss of control over the vehicle. An ABS of customary configuration, and particularly a system which can operate, with "select low" control, with respect to the rear axle, does not provide any advantages since the unloaded rear wheel due to the operation in the curve will have too much slippage before the ABS will respond.

THE INVENTION

It is an object to improve the road holding capability and operating characteristics of a vehicle, operating in a curved path, and to assist drivers in maintaining control even if the speed with which the vehicle may enter a curved path is excessive for proper, normal operation.

Briefly, a transverse acceleration sensor sensing, for example, centrifugal force is provided, and the braking effort applied to the rear wheels of the vehicle is controlled for at least a predetermined period of time to a low level, substantially below the effective braking level applied to the front wheels, provided three conditions pertain:

(1) a certain transverse acceleration is exceeded;
(2) the operator has applied the brake; and
(3) a limited time duration (t) has not yet elapsed.

The condition (2) can be derived from the brake light switch, and the time condition from a timing circuit.

Upon concurrence of conditions (1), (2) and (3), pressurized brake fluid applied to the rear wheels is inhibited from application to the brake, so that only a small, or no braking build-up can occur at the rear wheel brake. This retains almost complete lateral stability of the wheels of the rear axle.

The simple functional interrelationship between (1) transverse, or centrifugal acceleration and (2) braking can be expanded by introducing a time function beyond the limited time duration (t) for the holding period duration (T) of the low level braking effort applied to the rear wheels. Alternatively, timing can be discontinued or even initially eliminated if the ABS with respect to the front wheels has responded to, automatically, control both front wheels to be in the anti-blocking range which, also, takes some time.

The method and the apparatus carrying out the method has the advantage with respect to previously known systems that already present units, components and sensors used with a conventional ABS, such as magnetic valves, control units, circuit components and the like, need not be modified and can be used in the method and system of the present invention. The present invention may use, for example, a timing function which depends on vehicle speed, that is, a timing interval can be provided dependent on speed of the vehicle.

The method and system in accordance with the present invention permits stable operation of the vehicle even when braking in a curve up to the limit of adhesion of the wheels, which previously was not possible. Additionally, and very simply, the functional reliability of the system and method can be readily checked by providing a suitable test or monitoring circuit or configuration which, normally, is already present in the ABS, merely by adapting it to sense the operability of the system when operating in accordance with the method to be described.

DRAWINGS

DETAILED DESCRIPTION

Figure 1:
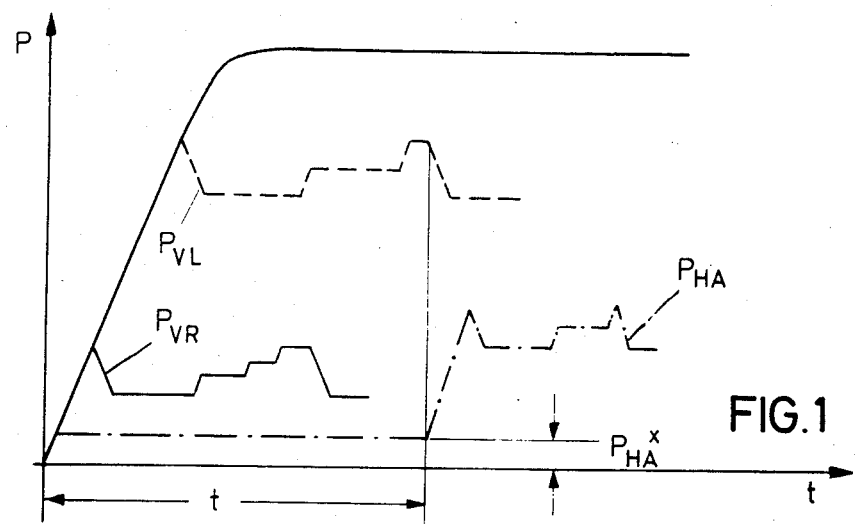
FIG. 1 is a schematic diagram of the pressures existing in the front wheels, and at the rear axle, with respect to time (abscissa)

The controlled pressures of brake fluid, for example supplied by a standard brake fluid pump, at the left front wheel and the right front wheel are shown by the curves $P_{VL}$ (left side) and $P_{VR}$ (right side). FIG. 1 additionally shows the brake pressure applied to the wheels of the rear axle $P_{HA}$. The abscissa represents the time axis.

At high transverse acceleration, that is, as a vehicle enters a curve, the front wheels become sutable at different pressure levels. Thus the pressure levels are substantially different at the two front wheels. In accordance with a feature of the invention, the level of the pressure of braking fluid, which corresponds to braking effort applied to the rear wheels, represented by the curve $P_{HA}$, is maintained for a pretermined time period t at a low fixed predetermined value $P_{HAX}$. Pressure at the rear wheels is permitted to rise—see chain-dotted curve—after elapse of the time t, until one of the rear wheels becomes unstable in accordance with the well known "select low" principle, and then triggers control of the brake fluid of the rear wheels in accordance with the standard function of an anti-lock brake system. Rather than using a time function—as illustrated in FIG. 1—or additionally it is possible to use a logic condition for terminating the brake fluid pressure maintenance phase of braking effort applied to the rear wheels. For example, if both front wheels are controlled, and the control signals are of the typical control signal wave form, it is possible to terminate the pressure maintenance phase of the braking effort applied to the rear wheels when a predetermined number of control cycles at the wheel at the outside of the curve has occurred, for example after the second control cycle, or upon beginning of the second control cycle. The wheel at the outside of the curve has the higher pressure level. At that time, the pressure, then, is permitted to rise at the rear axle. FIG. 1 illustrates the concurrence, for example, of the time instant t, and the occurrence of a second complete control cycle at the left front wheel of the vehicle.

In accordance with a feature of the invention, the time period t can be made dependent on the absolute speed of the vehicle, as sensed, for example, by the vehicle tachometer or as derived from the main shaft thereof.

Figure 1A:
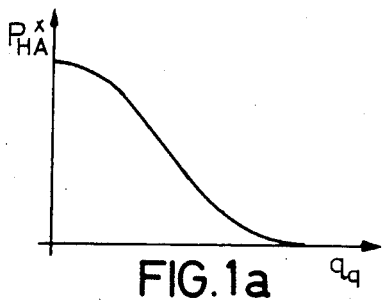
FIG. 1a illustrates the control function of rear axle braking fluid pressure as a function of transverse acceleration $a_q$.

The level of the rear axle braking effort, or, for example, pressurized brake fluid pressure, can be a function of the transverse acceleration $a_q$, as illustrated in FIG. 1a, where the pressure level $P_{HAx}$ is shown at the ordinate.

Figure 2A:
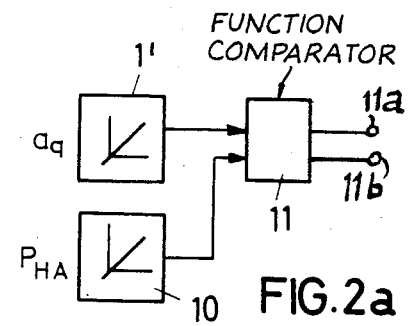
FIG. 2a is a fragmentary diagram utilizing an auxiliary signal derived from a pressure sensor, and sensing pressure within a controlled pressure circuit of the rear axle braking system.
Figure 2:
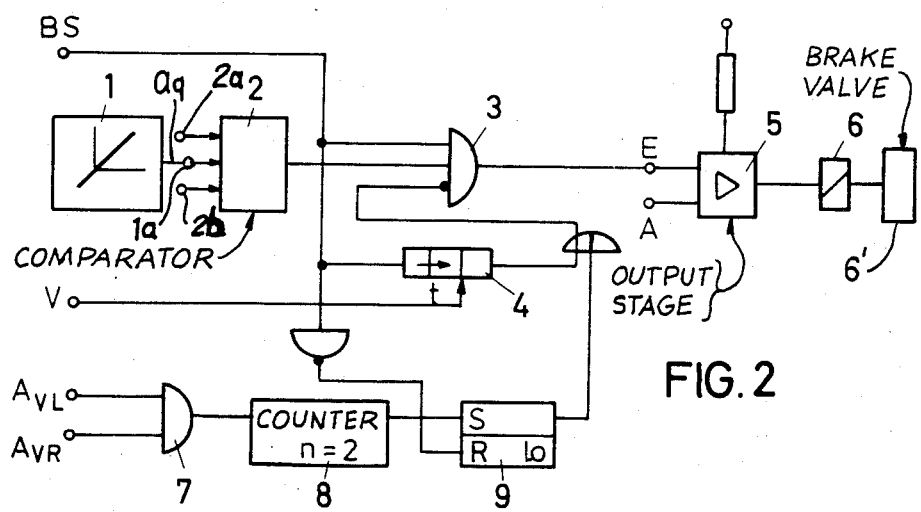
FIG. 2 is a block circuit diagram to carry out the method in accordance with the present invention.

The overall system is illustrated in FIG. 2. An analog signal $a_q$ of a transverse acceleration sensor 1 is applied over a terminal 1a to a comparator 2. The comparator has two threshold levels, applied to the terminals 2a, 2b, which become effective in dependence on whether the vehicle is steered in a curve towards the left, or in a curve towards the right. The output signal of the comparator 2 is applied to an AND-gate 3. If, upon transverse acceleration exceeding the respective reference level, a brake is applied, as determined by a brake applied signal from terminal BS, and if a timing circuit 4 has not yet provided an output signal, AND-gate 3 provides a brake control signal. The brake control signal controls an out-put stage 5. Stage 5, in the example shown, controls a three-position valve 6, controlling application of brake fluid to the brakes at the wheels of the rear axle, or to the rear axle itself. The brake control signal applied to the output circuit 5 at terminal E causes the brake valve 6 to inhibit both application of further pressurized brake fluid to a brake, and, also, drainage of brake fluid therefrom, so that a predetermined pressure level is maintained. The brake valve 6' is shown only schematically, and is electromagnetically controlled including the element 6 which, as shown, maintains the brake fluid pressure. The terminal BS may, for example, be connected to a signal derived from the brake light switch, so that the terminal BS will be energized when the operator steps on the brake pedal, thus causing the "brake applied" signal to be generated.

Upon initiation of braking, the signal BS is applied not only to the AND-gate 3, but, also, to the timing circuit 4.

When a predetermined timing interval, for example the interval t (FIG. 1), has elapsed, the AND-gate 3 will block and the brake control signal disappear, which, then inhibits operation of the control coil 6 controlling the brake valve 6' for pressure maintenance, and releasing the valve 6' to, again, receive pressurized brake fluid either under control of the operator, and/or under control of an ABS. The time duration t can be made dependent on vehicle speed by applying a vehicle speed signal from a terminal V to the timing circuit 4, so that the time duration t will vary as a function of vehicle speed.

The system can also be built differently or combined with additional components which, then, contribute to redundancy and hence reliability. For example, maintenance of braking pressure, that is, energization of the output stage 5, shown simply as an amplifier, to control the pressure maintenance coil 6 of the brake valve 6' can commence upon sensing of a control signal from that one of the front wheels which is unloaded. Rather than using the timing circuit or, respectively, in combination therewith, to block the AND-gate 3, a logic combination of signals derived from the front wheels can be used. For example, if pressure drop of the front wheel brakes is controlled, a representative "drain" or "pressure drop" signal $A_{VL}$ will be provided by an ABS for the left front wheel, and a similar signal $A_{VR}$ for the right front wheel. Upon conjunction of both signals $A_{VL}$ and $A_{VR}$, that is, signals indicating that the pressures in the front wheels should be dropped an AND-gate 7 is energized which then activates a counter 8, typically a counter having a count state of two. After two drop cycles, i.e. two counting steps, a memory, for example a flip-flop 9, is SET, which, thereupon, through an OR-gate connected also to the output of the timer 4 causes the AND-gate 3 to block. When the operator has released the brake, so that the signal from terminal BS, that is, the brake light switch, drops off, the memory 9 is RESET and, simultaneously, the counter is likewise set back to zero, in a suitable manner (not shown) and well known in digital control technology.

The system can be made even more specifically responsive by utilizing an auxiliary signal derived from a pressure sensor, which senses the pressure in the rear wheel brake circuit. FIG. 2a illustrates the arrangement in which the rear axle pressure $P_{HA}$ is sensed in a pressure sensor 10, and combined with the transverse acceleration signal $a_q$ derived from a transverse acceleration sensor 1'. Both signals are applied to a comparator 11, and compared therein, which comparator has a switching characteristic in accordance with the relationship illustrated in FIG. 1a, that is, the rear axle pressure is made dependent on the transverse acceleration $a_q$. Both signals, that of the rear axle transverse acceleration sensor 1' and that of the rear axle pressure sensor 10, are applied to a comparator 11, has a function comparison characteristic in accordance with FIG. 1a.

A signal at terminal 11a from the function comparator 11 is present, if the pressure $P_{HA}$ is at least equal to the pressure value $P_{HAx}$ which corresponds to the actual messured acceleration $a_q$. The signal at terminal 11a, which is fed to the terminal E of FIG. 2, thus brings valve 6/6' in the position, in which pressure is hold constant. If pressure $P_{HA}$ is higher than the just necessary pressure $P_{HAx}$ an additional signal is present at terminal 11b which is fed to termianl A in FIG. 2; hereby pressure drops until pressure value $P_{HAx}$ is reached. The invention is specifically adapted to be used with known automatic brake anti-block or anti-skid systems (ABS), so far example as described in U.S. Pat. No. 3,754,797, (Rodi et al), and especially also in U.S. Pat. No. 3,797,892 (Leiber), in which "select high" and "select low" are described. The present invention, thus, is particularly adapted as an addition to these previously described systems.

What is claimed is:

1. Method of controlling braking of an automatic vehicle operating in a curved path, using the steps of
generating front speed behavior signals controlling the braking effort applied to the front wheels of the vehicle ($P_{VL}$, $P_{VR}$) and rear speed behavior signals controlling the braking effort of the wheels at the rear axle ($P_{HA}$) of the vehicle when these signals show a tendency of the wheels to lock generating a limited time duration signal;
generating a "brake applied" signal (BS);
and comprising the steps of sensing and generating a signal when due to operation of the vehicle in the curved path, radial or transverse or centrifugal acceleration of the vehicle exceeds a predetermined level;
and, upon concurrence of conditions:
(1) said signal representing said radial or transverse or centrifugal acceleration exceeding said predetermined level;
(2) presence of the "brake applied" signal; and
(3) said limited time duration signal (t) has not yet elapsed, logically combining said signals to generate a brake control signal for inhibiting application of further pressurized brake fluid to the rear wheel brakes to maintain the pressure level ($P_{HA}x$) which is below the braking pressure resulting in the braking effort which would be applied to the rear wheels without this effect for at least said limited time duration.

2. Method according to claim 1, including the step of deriving a time interval;
and controlling said limited time duration signal by said time interval.

3. Method according to claim 2, including the step of generating a vehicle speed signal (V);
and controlling said limited time duration signal as a function of vehicle speed.

4. Method according to claim 1, including the step of sensing control of braking effort applied to at least one of the front wheels;
and determining said limited time duration signal as a function of a braking control function applied to said at least one front wheel.

5. Method according to claim 1, wherein the step of maintaining the braking effort applied to the rear wheels of the vehicle comprises maintaining braking effort at the rear wheels at a constant level during said brake control signal.

6. Method according to claim 5, including the step of maintaining braking effort applied to the rear wheels of the vehicle as a function of:
(a) sensing the predetermined level of said radial or transverse or centrifugal acceleration and
(b) operation of the brake system of the vehicle.

7. Method according to claim 1, wherein the step of maintaining braking effort applied to the rear wheels comprises sensing presence of said radial or transverse or centrifugal acceleration at the predetermined level; and
sensing signals representative of controlling braking effort on at least one of the front wheels of the vehicle.

8. Method according to claim 1, wherein the step of maintaining the level of braking effort applied to the rear wheels of the vehicle comprises generating said signal ($a_q$) representative of said radial or transverse or centrifugal acceleration of the vehicle, sensing the level of the signal representative of said radial or transverse or centrifugal acceleration, and controlling the level of the braking effort applied to the rear wheels of the vehicle as a function of the sensed level of the radial or transverse or centrifugal acceleration.

9. Apparatus to maintain stability of a vehicle entering a curve while brakes of the vehicle are applied, having
means (1, 1') sensing radial or transverse or centrifugal acceleration of the vehicle and generating a transverse acceleration signal;
means for generating a signal representative of a limited time duration (t)
means (BS) for sensing application of the vehicle brakes and providing a "brake applied" signal; and
means (5, 6) controlling application of the braking pressure level resulting in the braking effort on the rear wheels of the vehicle, comprising
means (3) for logically conjunctively combining:
(1) said radial or transverse or centrifugal acceleration signal;
(2) said "brake applied" signal, and
(3) said signal representative of said limited time duration (t),
said logic combining means (3) generating, upon presence of said conditions, a braking control signal;
and means (6) coupled to the logic combining means (3) for, upon presence of said brake control signal, maintaining the pressure level resulting in the braking effort at the rear wheels of the vehicle at a level below the level of pressure resulting in the braking effort which would be applied to the rear wheels of the vehicle without this maintenance effect.

10. Apparatus according to claim 9, including a comparator (2) having said radial or transverse or centrifugal acceleration signal levels (2a, 2b) applied thereto, and respectively representative of said radial or transverse or centrifugal acceleration in a path of the vehicle to the left or to the right, as well as said acceleration signal, to provide an output when the generated signal representative of said radial or transverse or centrifugal acceleration exceeds the predetermined level.

11. Apparatus according to claim 9, wherein the means (6) for controlling the braking effort at the rear wheels of the vehicle comprises means maintaining the braking effort constant for said limited time duration.

12. Apparatus according to claim 11, wherein said means for generating said limited time duration includes a timing element (4) controlling the duration of said limited time duration, and connected to said logic combining means (3) and controlling said braking effort maintenance level control means.

13. Apparatus according to claim 12, further including means for deriving a vehicle speed signal (V) coupled to and controlling the timing duration of said timing element (4).

14. Apparatus according to claim 10, further including pressure measuring means (10) for the pressure in the rear wheels, both the said measuring means and said acceleration sensor means (1') being coupled to the comparator (11) providing a function output relating the braking effort applied to the rear wheels of the vehicle to the level and degree of said sensed radial or transverse or centrifugal acceleration sensed by said acceleration sensor means.

* * * * *